(12) United States Patent
Bourget et al.

(10) Patent No.: US 7,732,735 B2
(45) Date of Patent: *Jun. 8, 2010

(54) HOT MELT ADHESIVE HOSE ASSEMBLY HAVING REDUNDANT COMPONENTS

(75) Inventors: Daniel D. Bourget, Hendersonville, TN (US); Paul J. Donley, Hendersonville, TN (US); Mairi MacLean, Hendersonville, TN (US)

(73) Assignee: Illinois Tool Works Inc., Glenview, IL (US)

( * ) Notice: Subject to any disclaimer, the term of this patent is extended or adjusted under 35 U.S.C. 154(b) by 415 days.

This patent is subject to a terminal disclaimer.

(21) Appl. No.: 11/250,462

(22) Filed: Oct. 17, 2005

(65) Prior Publication Data

US 2006/0289561 A1    Dec. 28, 2006

Related U.S. Application Data

(63) Continuation-in-part of application No. 11/123,053, filed on May 6, 2005.

(51) Int. Cl.
*H05B 3/00* (2006.01)
*B67D 5/08* (2006.01)

(52) U.S. Cl. .................. 219/221; 219/494; 219/497; 392/465; 392/466; 222/146.5

(58) Field of Classification Search .......... 219/494, 219/497, 499, 501, 505, 508, 509, 221; 392/465, 392/466, 478, 488; 222/186.2, 186.5, 526, 222/527, 529

See application file for complete search history.

(56) References Cited

U.S. PATENT DOCUMENTS 4,455,474 A    6/1984   Jameson et al.
4,523,084 A    6/1985   Tamura et al.
4,616,894 A    10/1986  Baker (Continued)

FOREIGN PATENT DOCUMENTS

DE    20106348    9/2001

*Primary Examiner*—Thor S Campbell
(74) *Attorney, Agent, or Firm*—Law Offices of Steven W. Weinrieb (57) ABSTRACT

A new and improved hot melt adhesive hose assembly has a hot melt adhesive hose core, a pair of heater circuits wrapped around the external peripheral surface of the hose core, and a pair of temperature sensors also disposed in contact with the external peripheral surface of the hose core. A first one of the heater circuits is initially electrically connected to the hot melt adhesive hose assembly electrical circuitry, and in a similar manner, a first one of the temperature sensors is electrically connected to the hot melt adhesive hose assembly electrical circuitry. Should a failure occur within the first one of the heater circuits, or within the first one of the temperature sensors, electrical switch mechanisms, which are fixedly mounted upon the hose assembly, can be actuated so as to effectively remove the first, failed heater circuit, or the first, failed temperature sensor from the hot melt adhesive hose assembly electrical circuitry, and substantially simultaneously therewith, electrically connect the second one of the heater circuits, or temperature sensors, to the hot melt adhesive hose assembly electrical circuitry. The hot melt adhesive hose assembly, including the heater circuits, the temperature sensors, and the switch mechanisms, effectively comprises a self-contained, stand-alone, or independent operative component that can be utilized in conjunction with any adhesive supply unit (ASU) and its temperature controller.

11 Claims, 3 Drawing Sheets

U.S. PATENT DOCUMENTS

| | | | |
|---|---|---|---|
| 4,716,520 A * | 12/1987 | Locke et al. | ............... 700/81 |
| 4,852,544 A | 8/1989 | Williams et al. | |
| 5,719,378 A | 2/1998 | Jackson et al. | |
| 6,168,049 B1 | 1/2001 | Bolyard, Jr. | |
| 6,342,264 B1 | 1/2002 | Raterman et al. | |
| 6,549,034 B1 | 4/2003 | Pietrzyk et al. | |
| 6,646,237 B2 | 11/2003 | Liu | |
| 6,909,923 B2 | 6/2005 | Vasko | |
| 7,084,377 B2 | 8/2006 | Raterman et al. | |
| 2004/0258792 A1 | 6/2004 | Olaru et al. | |
| 2005/0092736 A1 | 5/2005 | Raterman et al. | |
| 2005/0279292 A1 * | 12/2005 | Hudson et al. | ............... 122/32 |

\* cited by examiner

HOT MELT ADHESIVE HOSE ASSEMBLY HAVING REDUNDANT COMPONENTS

CROSS-REFERENCE TO RELATED PATENT APPLICATIONS

This patent application is a Continuation-In-Part of U.S. patent application Ser. No. 11/123,053 which is entitled HOT MELT ADHESIVE HOSE ASSEMBLY HAVING REDUNDANT COMPONENTS, and which was filed on May 6, 2005 in the name of Daniel D. Bourget et al. This patent application is also related to U.S. patent application Ser. No. 11/123,028 which is entitled REDUNDANT CONTROL CIRCUIT FOR HOT MELT ADHESIVE HOSE ASSEMBLY HEATER CIRCUITS AND TEMPERATURE SENSORS, and which was also filed on May 6, 2005 in the name of Daniel D. Bourget et al., and is also related to U.S. patent application Ser. No. 12/007,070 which is entitled REDUNDANT CONTROL CIRCUIT FOR HOT MELT ADHESIVE HOSE ASSEMBLY HEATER CIRCUITS AND TEMPERATURE SENSORS, and which was also filed on Jan. 7, 2008 in the name of Daniel D. Bourget et al.

FIELD OF THE INVENTION

The present invention relates generally to hot melt adhesive dispensing systems, and more particularly to a new and improved hot melt adhesive hose assembly which effectively has redundant components inherently incorporated therein, such as, for example, redundant hot melt adhesive heater circuits, and redundant hot melt adhesive temperature sensors, as well as suitable switching mechanisms, whereby the hot melt adhesive hose assembly, including the heater circuits, the temperature sensors, and the switching mechanisms, effectively comprises a stand-alone, self-contained, or independent operative component that can be utilized in conjunction with any adhesive supply unit (ASU) and its temperature controller. Accordingly, should a failure occur within one of the hot melt adhesive heater circuits, or within one of the hot melt adhesive temperature sensors, the switching mechanisms may be suitably actuated so as to effectively withdraw the failed hot melt adhesive heater circuit, or the failed hot melt adhesive temperature sensor, from its operative or functional disposition within the electrical circuitry, and to substantially simultaneously therewith, insert the backup or redundant hot melt adhesive heater circuit, or the backup or redundant hot melt adhesive temperature sensor, into the control circuitry whereby the hot melt adhesive hose assembly does not need to be replaced immediately but can be subsequently replaced in accordance with, for example, normal scheduled maintenance procedures, the hot melt adhesive dispensing production line does not need to be shut down for repairs whereby extensive downtime to replace the failed hot melt adhesive hose assembly is effectively able to be avoided, and the hot melt adhesive dispensing production line can continue to operate without any production downtime.

BACKGROUND OF THE INVENTION

In connection with hot melt adhesive dispensing systems, failures can generally occur within two different categories, that is, mechanical failures due to wear, or electrical failures due to electrical malfunctions. More particularly, in connection with the different types of electrical failures that can be experienced, electrical failures can occur, such as, for example, either within the heater circuit which is used to maintain the hot melt adhesive material, that is flowing through the hot melt adhesive hose assembly, at a predetermined temperature level, or within the temperature sensor which is operatively or thermally associated with the hot melt adhesive hose assembly in order to effectively detect the temperature level of the hot melt adhesive material, which is flowing through the hot melt adhesive hose assembly, and which effectively controls the heater circuit, through means of the adhesive supply unit (ASU) and its temperature controller, so as to ensure that the desired temperature level of the hot melt adhesive material, which is flowing through the hot melt adhesive hose assembly, is in fact maintained. Maintenance of the proper or desired temperature level of the hot melt adhesive material, which is flowing through the hot melt adhesive hose assembly, is therefore of course critical in order to ensure that the hot melt adhesive material will have the proper viscosity characteristics so as to be properly dispensed and therefore provide the desired adhesive properties once the hot melt adhesive material is in fact deposited onto a particular substrate. In either case, that is, whether a failure is experienced in connection with the heater circuit, or in connection with the temperature sensor, such failures typically cause the hot melt adhesive dispensing production line to be shut down for extended periods of time, in order to implement the repair or replacement of the failed components, whereby valuable production time is lost.

A hot melt adhesive dispensing apparatus employing redundant temperature sensing devices is disclosed within United States Patent Application Publication 2005/0092736 which was published on May 5, 2005 in the name of Raterman et al. More particularly, as can be appreciated from FIG. 1, which substantially corresponds to FIG. 1 of the afore-noted patent publication, the adhesive dispensing apparatus of Raterman et al. is generally indicated by the reference character 10 and is seen to comprise an adhesive dispensing gun 20 for depositing adhesive material 22 onto a substrate 24. The adhesive dispensing gun 20 is mounted upon a manifold 18, and a supply tank or adhesive supply unit (ASU) 16, containing a supply of the adhesive material 22, is fluidically connected to the manifold 18 by means of a hose assembly 12 and a pump 14, with an inlet end 42 of the hose assembly 12 being fixedly connected to the pump 14 while an outlet end 44 of the hose assembly 12 is fixedly connected to the manifold 18. The hose assembly 12 is also provided with a wire harness 28 which is connected to a controller 32, through means of an electrical connector 80, which is mounted upon the supply tank or adhesive supply unit (ASU) 16, and the supply tank or adhesive supply unit (ASU) 16 also includes a heater 26 which is selectively controlled so as to maintain the adhesive material 22, disposed within the supply tank or adhesive supply unit (ASU) 16, within a predetermined temperature range.

Figure 1:
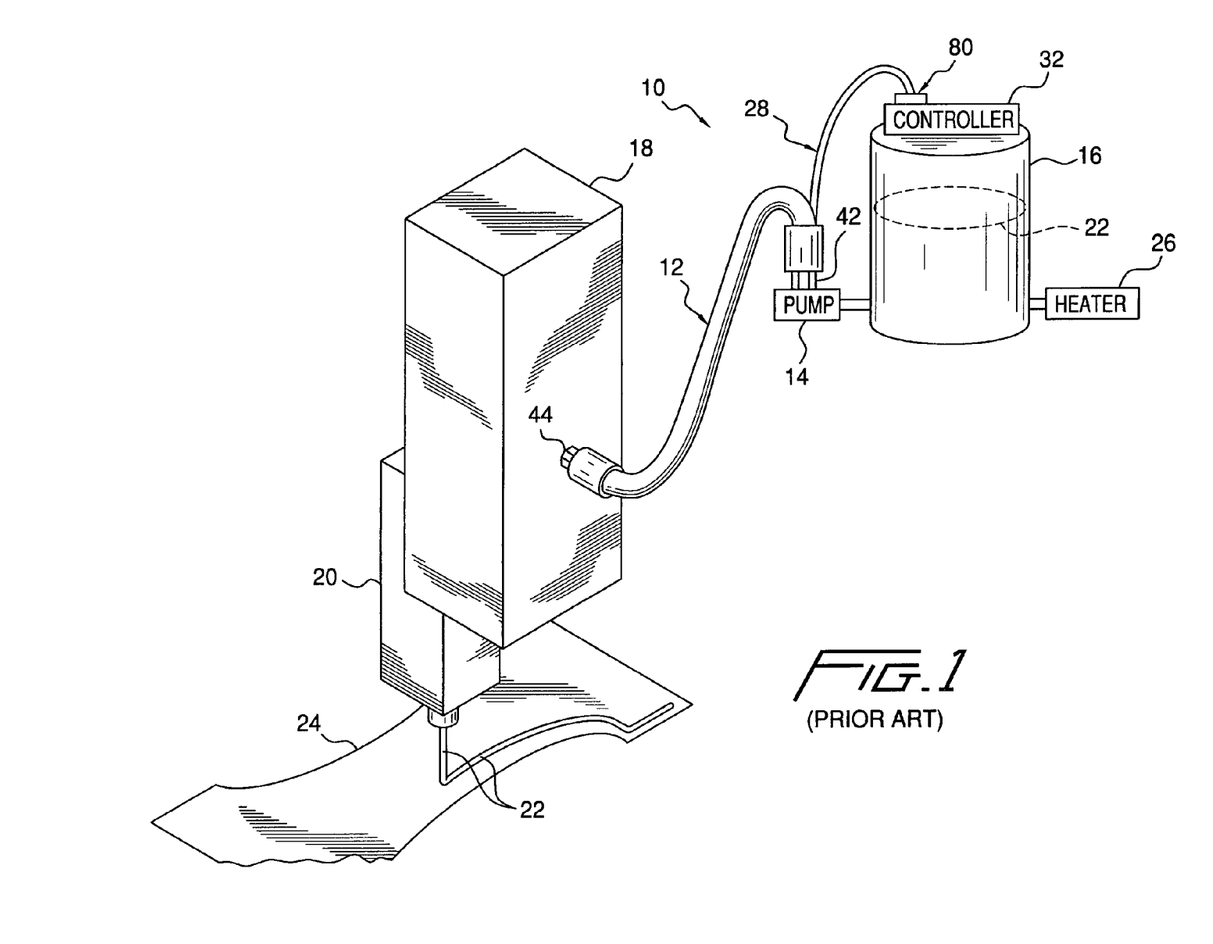
FIG. 1 is a perspective view of a conventional, PRIOR ART hot melt adhesive dispensing system wherein redundant temperature sensing devices are operatively associated with the hot melt adhesive hose assembly.

The hose assembly 12 further comprises a heating element and a pair of temperature sensing devices, not illustrated within FIG. 1 but fully disclosed within the afore-noted patent publication to Raterman et al., wherein the pair of temperature sensing devices sense the temperature of the adhesive material flowing through the hose assembly 12, and wherein further, the pair of temperature sensing devices are alternatively electrically connected to the controller 32 so as to in fact monitor the temperature of the adhesive material 22 flowing through the hose assembly 12. The controller 32 monitors the temperature from one or both of the two temperature sensing devices and controls the operation of the heating element, based upon the readings from the particular one or both of the two temperature sensing devices so as to maintain the hot melt adhesive material at a desired temperature level. If one of the two temperature sensing devices is found to be malfunctioning or failing, then that particular one of the two temperature sensing devices is deactivated and the other one of the two temperature sensing devices is activated or remains active so as to function within the heater control system. The switch-over between the two temperature sensing devices may be either accomplished manually, such as, for example, by hard wiring the temperature sensing devices to the controller input, or automatically through means of a suitable relay or other control operation or circuit incorporated within the controller 32.

While the hot melt adhesive dispensing apparatus employing the redundant temperature sensing devices, as disclosed within the aforenoted patent application publication to Raterman et al., is operationally satisfactory, several operational drawbacks of the apparatus are also apparent from the disclosure. For example, it is initially noted that while redundant temperature sensing devices are disclosed, there is no disclosure of redundant heating elements. This is critically important in that, as has been noted hereinbefore, electrical failures can occur within the heater circuit which is used to maintain the hot melt adhesive material, that is flowing through the hot melt adhesive hose assembly, at a predetermined temperature level, as well as within the temperature sensor which detects the temperature level of the hot melt adhesive material that is flowing through the hot melt adhesive hose assembly. Furthermore, and just as importantly, if not more importantly, as has also been noted hereinbefore, the redundant temperature sensing devices of the Raterman et al. apparatus or system are intimately connected to the temperature controller 32 that forms an integral part of the adhesive supply unit (ASU) 16. Accordingly, the hose assembly 12 is intimately dependent upon, and can only be used in conjunction with, the particular temperature controller 32 and the particular adhesive supply unit (ASU) 16. Viewed from a slightly different perspective or point of view, the hose assembly 12 of Raterman et al. does not comprise a stand-alone, self-contained, or independent operative component that can readily be used in conjunction with any adhesive supply unit (ASU), or viewed in a still similar manner, the hose assembly 12 of Raterman et al. cannot be disconnected from a particular adhesive supply unit (ASU) and readily operatively connected to another adhesive supply unit (ASU).

A need therefore exists in the art for a new and improved hot melt adhesive hose assembly within which both redundant heater circuits and temperature sensing devices could effectively be incorporated such that if a failure occurs within a particular one of such redundant electrical components, the failed electrical component could effectively be removed from its operative or functional disposition within the electrical circuitry, and the other electrical component could effectively be operatively or functionally incorporated into the electrical circuitry. In this manner, the hot melt adhesive dispensing production line would not need to be shut down for extended periods of time, in order to implement the replacement of the failed hot melt adhesive hose assemblies, whereby valuable production time would not be lost. In addition, a need exists in the art for a new and improved hot melt adhesive hose assembly wherein the hot melt adhesive hose assembly, including the heater circuits, the temperature sensors, and the switch mechanisms, effectively comprises a stand-alone, self-contained, or independent operative component which can be utilized in conjunction with any adhesive supply unit (ASU) and its temperature controller.

SUMMARY OF THE INVENTION

The foregoing and other objectives are achieved in accordance with the teachings and principles of the present invention through the provision of a new and improved hot melt adhesive hose assembly which comprises a hot melt adhesive hose core, a pair of heater circuits which are wrapped around the external peripheral surface of the hose core, a pair of temperature sensors which are also disposed in contact with the external peripheral surface of the hose core, and a pair of switch mechanisms which are also an integral component part of the hot melt adhesive hose assembly. Accordingly, the new and improved hot melt adhesive hose assembly, including the heater circuits, the temperature sensors, and the switch mechanisms, effectively comprises a self-contained, standalone, or independent operative component that can be utilized in conjunction with any adhesive supply unit (ASU) and its temperature controller. A first one of the heater circuits would initially be electrically connected to the hot melt adhesive hose assembly electrical circuitry, and in a similar manner, a first one of the temperature sensors would likewise be electrically connected to the hot melt adhesive hose assembly electrical circuitry.

Subsequently, should a failure occur within the first one of the heater circuits, then one of the electrical switch mechanisms would be activated so as to effectively remove the first, failed heater circuit from the hot melt adhesive hose assembly electrical circuitry, and substantially simultaneously therewith, electrically connect the second one of the heater circuits to the hot melt adhesive hose assembly electrical circuitry. Similar switching procedures could also be implemented in connection with the pair of temperature sensors should a failure occur within a first one of the temperature sensors initially incorporated within the hot melt adhesive hose assembly electrical circuitry. In this manner, the hot melt adhesive hose assembly does not need to be replaced immediately but can be subsequently replaced in accordance with, for example, normal scheduled maintenance procedures, the hot melt adhesive dispensing production line does not need to be shut down for repairs whereby extensive downtime to replace the failed hot melt adhesive hose assembly is effectively able to be avoided, and the hot melt adhesive dispensing production line can continue to operate without any production downtime.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Referring now to the drawings, and more particularly to FIG. 1 thereof, a new and improved hot melt adhesive hose assembly, for dispensing hot melt adhesive material, as constructed in accordance with the principles and teachings of the present invention, is disclosed and is generally indicated by the reference character 10. More particularly, the new and improved hot melt adhesive hose assembly 10 is seen to comprise an applicator end upon which there is disposed a first end fitting 12 for operative connection to a hot melt adhesive dispensing applicator, nozzle, or the like, and an adhesive supply unit end upon which there is disposed a second end fitting 14 for operative connection to a source of hot melt adhesive material known as an adhesive supply unit (ASU). The end fittings 12,14 are disposed upon opposite ends of a tubular member 16 which is fabricated from TEFLON®, and a suitable stainless steel wire braid-type woven layer 22 is disposed therearound, the end fittings 12,14, the TEFLON® tubing, and the stainless steel wire braid-type woven layer 22 comprising the hose core. It is seen that the hose core extends coaxially through the entire hot melt adhesive hose assembly 10 so as to fluidically connect the hot melt adhesive supply end of the hot melt adhesive hose assembly 10 to the hot melt adhesive applicator or dispensing end of the hot melt adhesive hose assembly 10 so as to thereby, in turn, provide a flow path for the hot melt adhesive material, as supplied to the hot melt adhesive hose assembly 10 from the hot melt adhesive supply unit (ASU), not shown, to the hot melt adhesive applicator or dispensing nozzles, also not shown.

As is well known in the art, hot melt adhesive material is normally supplied to a hot melt adhesive hose assembly, from a hot melt adhesive supply unit (ASU), not illustrated, in a heated state, and a heater circuit is operatively associated with the hot melt adhesive hose assembly in order to maintain the hot melt adhesive material at a predetermined temperature level, while the same is being conducted through the hot melt adhesive hose assembly, such that the hot melt adhesive material will have or exhibit the proper viscosity properties when the hot melt adhesive material is dispensed from the applicator end of the hot melt adhesive hose assembly. In accordance with a first unique and novel feature characteristic of the present invention, and in lieu of a single heater circuit being provided in conjunction with the hot melt adhesive hose assembly, first and second heater circuits 18,20, comprising first and second heater resistance wires, are provided in conjunction with the hot melt adhesive hose assembly 10. The first and second heater circuits 18,20, which effectively comprise dual or redundant heater circuits for a purpose which will be discussed more fully hereinafter, are adapted to be spiral-wrapped around the external peripheral surface of the hose core 16, but in reality, the first and second heater circuits 18,20, comprising the first and second heater resistance wires, are not disposed in direct contact with the external peripheral surface of the hose core 16, but to the contrary, are adapted to be coiled or wrapped around the external peripheral surface of a multi-layer cylindrical or tubular laminate.

More particularly, the hose core 16 has a suitable stainless steel wire braid-type woven layer 22 disposed therearound, and it is further seen that the stainless steel braid-type woven layer 22 is covered by means of a first layer of KAPTON® tape 24 which is preferably wrapped in accordance with a fifty-percent (50%) overlap technique. A second fiberglass tape 26, having a suitable adhesive disposed only upon the internal side surface thereof, is wrapped around or atop the KAPTON® tape 24, preferably in accordance with a similar fifty-percent (50%) overlap technique, and a third fiberglass tape 28, having a suitable adhesive disposed upon both the internal and external side surfaces thereof, is wrapped around or atop the second fiber-glass tape 26. As a result of the third fiberglass tape 28 being coated upon both the internal and external side surfaces thereof with a suitable adhesive, the first and second heater circuits 18,20 may be readily adhered thereto. It is noted that the first heater circuit 18 is initially wrapped or wound around the external peripheral surface of the underlying third fiberglass tape 28 in accordance with a predeterminedly selected pitch or spacing being defined between successive coils or windings of the first heater circuit 18, and in this manner, when the second heater circuit 20 is wrapped or wound around the external peripheral surface of the underlying third fiberglass tape 28, each coil or winding of the second heater circuit 20 may be interposed between adjacent coils or windings of the first heater circuit 18 such that the pitch or spacing defined between successive coils or windings of the second heater circuit 20 is substantially the same as the aforenoted pitch or spacing defined between the successive coils or windings of the first heater circuit 18. Subsequently, the first and second heater circuits 18,20 may be further secured to the underlying third fiberglass tape 28 by means of a fourth layer of fiberglass tape 30 which may be similar to the second fiberglass tape 26.

Continuing further, as is also well known in the art, a temperature sensor is operatively associated with the hot melt adhesive hose assembly so as to effectively detect or sense the temperature level of the hot melt adhesive material being conducted through the hot melt adhesive hose assembly so as to, again, ensure that the hot melt adhesive material is in fact at the proper temperature level, while the same is being conducted through the hot melt adhesive hose assembly, such that the hot melt adhesive material will have or exhibit the proper viscosity properties when the hot melt adhesive material is dispensed from the applicator end of the hot melt adhesive hose assembly. As was therefore the case with the aforenoted provision of the dual or redundant heater circuits 18,20, in accordance with a second unique and novel feature characteristic of the present invention, and in lieu of a single temperature sensor being provided in conjunction with the hot melt adhesive hose assembly, as well as in conjunction with the first and second heater circuits 18,20, a pair of temperature sensors 32,34 are provided in conjunction with the hot melt adhesive hose assembly 10. The first and second temperature sensors 32,34, which effectively comprise dual or redundant temperature sensors for a purpose which will be discussed more fully hereinafter, are adapted to be disposed externally of the aforenoted multi-layer cylindrical or tubular laminate, and while the dual or redundant temperature sensors 32,34 are illustrated as being disposed within a linear array with respect to each other upon one external side portion of the laminated hot melt adhesive hose assembly 10, the pair of dual or redundant temperature sensors 32,34 can likewise be disposed upon diametrically opposite external side portions of the laminated hot melt adhesive hose assembly 10. Each one of the temperature sensors 32,34 may comprise either a resistance temperature detector (RTD), a thermistor, or a thermocouple.

Each one of the dual or redundant temperature sensors 32,34 is adapted to be respectively encased within suitable insulation, such as, for example, a fiberglass sleeve 36,38, and first end portions of lead wires 40,42 and 44,46, provided for each one of the temperature sensors 32,34, have terminals 48,50 and 52,54 applied thereto which are, in turn, respectively encased within suitable insulation, such as, for example, silicone rubber-covered fiberglass sleeves 56,58 and 60,62. In a similar manner, both of the heater resistance wires comprising the first and second heater circuits 18,20 have terminals applied to first end portions thereof, only one of which is shown at 64, such as, for example, the terminal operatively associated with the first heater circuit 18, and each one of the terminals is respectively encased within suitable insulation, such as, for example, a silicone rubber-covered fiberglass sleeve, only one of which is illustrated at 66. It is to be noted that the terminal 64 and the silicone rubber-covered fiberglass sleeve 66 components for the first heater circuit 18, and the terminal and silicone rubber-covered fiberglass sleeve components, not illustrated, for the second heater circuit 20, can be disposed upon diametrically opposite external side surface portions of the laminated hot melt adhesive hose assembly 10. The temperature sensors 32,34, and all of the terminals 48,50,52,54,64 for the heater circuits 18,20 and the temperature sensors 32,34 are adapted to be secured to external side surface portions of the laminated hot melt adhesive hose assembly 10 by means of suitable fiberglass tape, and subsequently, the lead wires 40,42,44,46,68 for the temperature sensors 32,34 and the heater resistance wires 18,20 are wrapped or coiled around the external side surface portions of the laminated hot melt adhesive hose assembly 10, conducted back toward the adhesive supply unit end of the hot melt adhesive hose assembly 10, and are adapted to be electrically connected to a switch assembly box 70 through means of a first coaxial electrical cable 72.

It is noted that additional wires, as exemplified by means of wire 74, are also electrically connected to the coaxial electrical cable 72, and that a second coaxial electrical cable 76 interconnects the switch assembly box 70 to a first electrical connector assembly 78, the various additional wires 74 serving to provide electrical connections to various electrical components at the adhesive supply unit end of the hot melt adhesive hose assembly 10, such as, for example, hot melt adhesive material supply valving, hot melt adhesive material supply pumps, and the like. In a similar manner, it is noted that additional wires, as exemplified by means of wire 80, are electrically connected to another coaxial electrical cable 82 which, in turn, is electrically connected to a second electrical connector assembly 84, the various additional wires 80 serving to provide electrical connections to various electrical components at the applicator end of the hot melt adhesive hose assembly 10, such as, for example, solenoid-controlled dispensing or discharge control valving, dispensing or discharge nozzle structures, and the like. In order to complete the entire hot melt adhesive hose assembly 10, the aforenoted additional wires 74,80 are also secured by means of fiberglass tape, and the laminated assembly is then adapted to be wrapped with insulation felt 86 which is wrapped in accordance with a fifty-percent (50%) overlap technique. An orange-colored vinyl tape 88, having company name or logo information thereon is then wrapped over the insulation felt 86, and a transparent braid sleeve member 90, fabricated, for example, from polyethylene terephthalate (PET), is then slid over the orange-colored vinyl tape 88, although it is noted, of course, that other types of tapes or sleeve members may be utilized. Lastly, cuff members 92,94 and 96, 98, which comprise mating-half sections or housings, are secured around the opposite applicator and adhesive supply unit ends of the hot melt adhesive hose assembly 10, and a product or data label 100 may be applied around the cuff housing, comprising the cuff members 96,98, at the adhesive supply unit end of the hot melt adhesive hose assembly 10. Again, however, in lieu of the two-part mating half cuff members, other covering or insulating techniques or structures, such as, for example, shrink-wrapping, or the like, may be employed.

In accordance with an additional unique and novel feature characteristic of the present invention, and in conjunction with the aforenoted dual or redundant heater circuits 18,20, as well as in conjunction with the aforenoted dual or redundant temperature sensors 32,34, a pair of dual-position slide switch mechanisms 102,104 are incorporated within the switch box assembly 70 and are adapted to be respectively electrically connected to the dual or redundant heater circuits 18,20 and to the dual or redundant temperature sensors 32,34. More particularly, as can be appreciated still further as a result of additional reference being made to FIG. 2, the first and second heater circuits or heater resistance wires are schematically disclosed at 18,20, the first and second temperature sensors are schematically disclosed at 32,34, and the first and second dual-position slide switch mechanisms are disclosed at 102,104. The dual-position slide switch mechanism 102 is seen to comprise electrical terminals 106,108,110,112,114, 116, wherein the central terminals 110,112 define the common terminals when the dual-position slide switch mechanism 102 is disposed at either one of its first upper or second lower positions, and the dual-position slide switch mechanism 104 is seen to comprise electrical terminals 118,120, 122,124,126,128 wherein the central terminals 122,124 likewise define the common terminals when the dual-position slide switch mechanism 104 is disposed at either one of its first upper or second lower positions.

Figure 2:
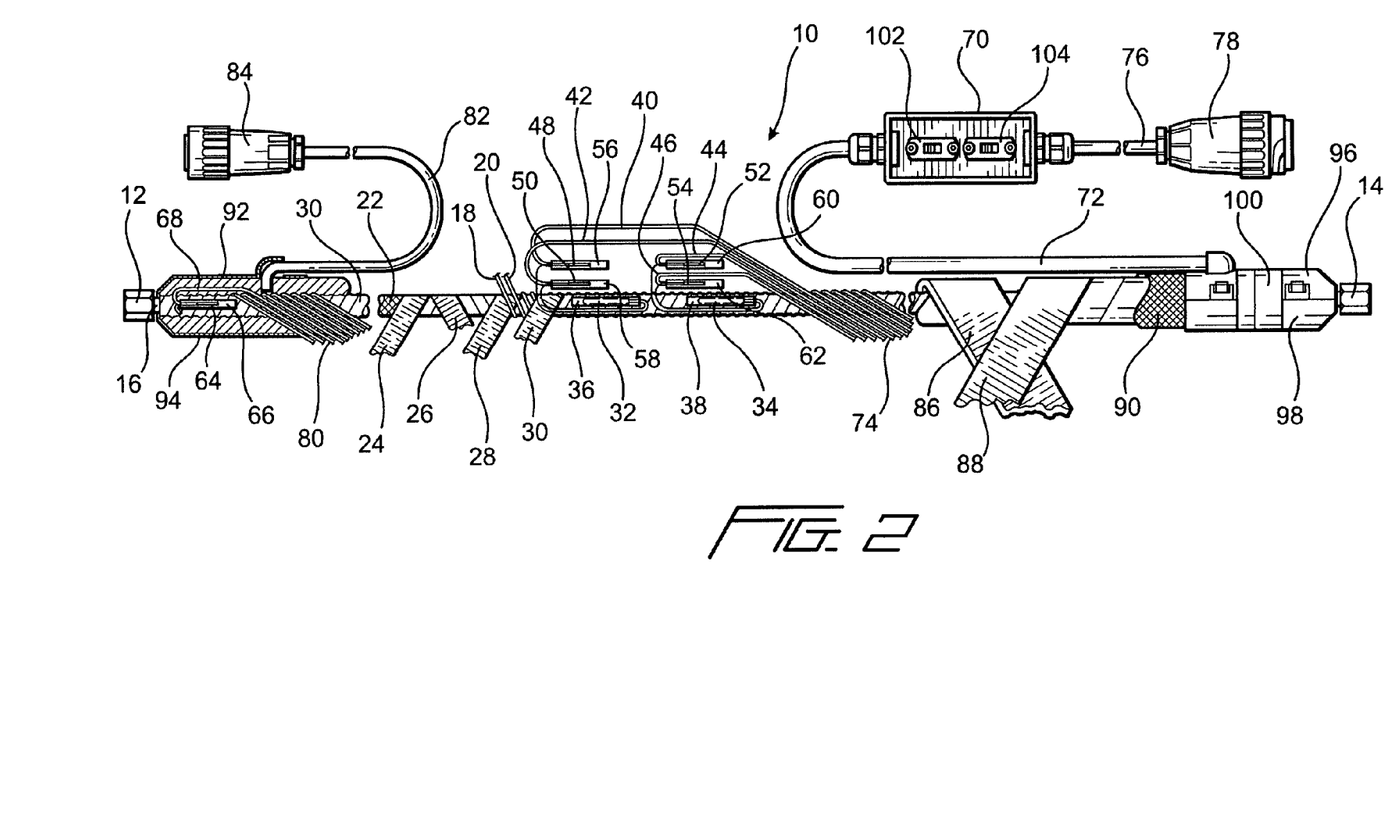
FIG. 2 is a schematic view of a new and improved hot melt adhesive hose assembly, and its operatively associated electrical circuitry, as constructed in accordance with the principles and teachings of the present invention and showing the cooperative parts thereof.
Figure 3:
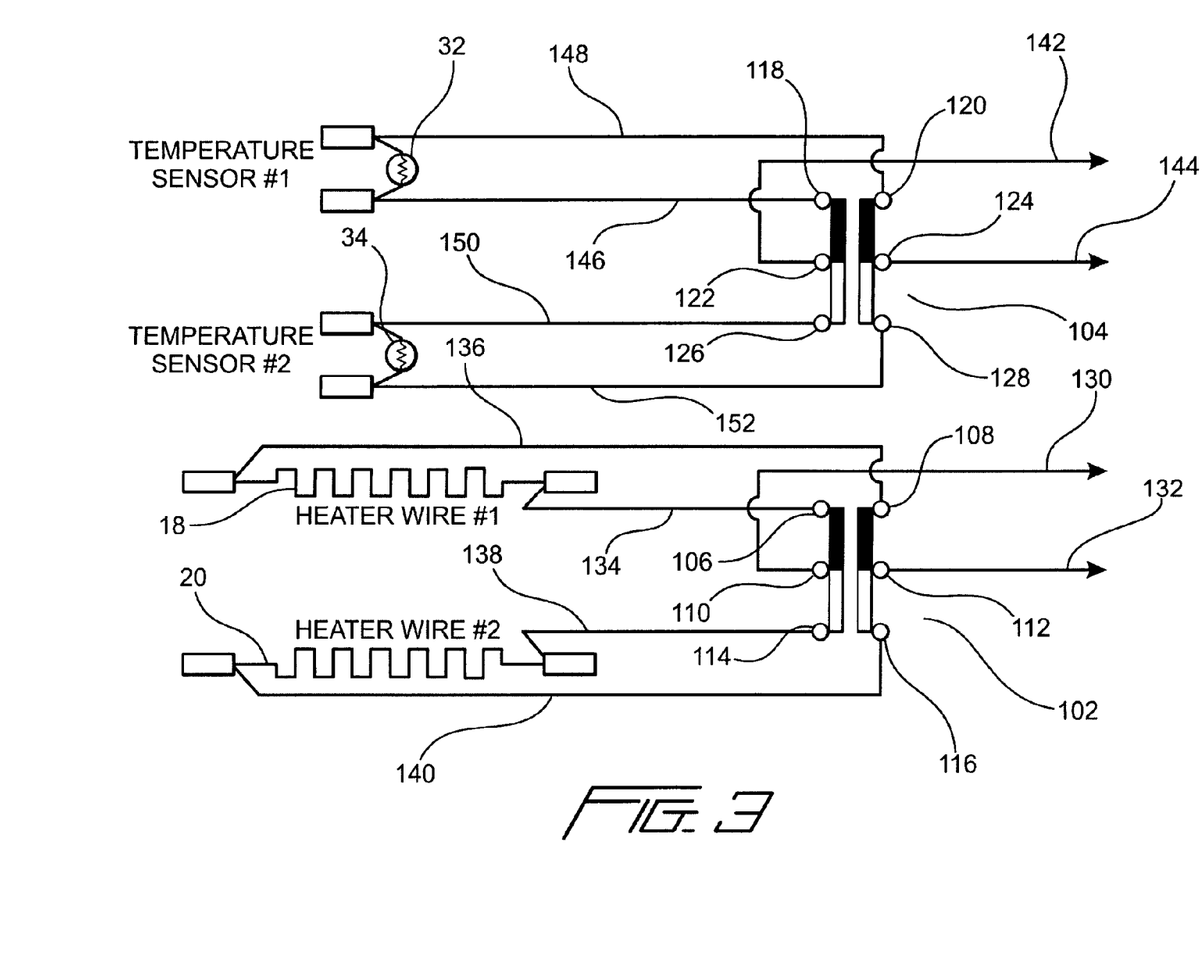
FIG. 3 is a schematic wiring diagram showing the incorporation of the dual, redundant heater circuits, the dual, redundant temperature sensors, and the dual-position switch mechanisms therefor, into the hot melt adhesive assembly electrical circuitry.

Electrical lines 130,132 connect the common terminals 110,112 of the dual-position slide switch mechanism 102 to an external source of electrical power, not shown, while electrical lines 134,136 respectively connect the terminals disposed upon the opposite ends of the first heater resistance wire 18 to the terminals 106,108 of the dual-position slide switch mechanism 102, and electrical lines 138,140 respectively connect the terminals disposed upon the opposite ends of the second heater resistance wire 20 to the terminals 114, 116 of the dual-position slide switch mechanism 102. In a similar manner electrical lines 142,144 connect the common terminals 122,124 of the dual-position slide switch mechanism 104 to the external source of electrical power, not shown, while electrical lines 146,148 respectively connect the terminals disposed upon the opposite ends of the first temperature sensor 32 to the terminals 118,120 of the dual-position slide switch mechanism 104, and electrical lines 150,152 respectively connect the terminals disposed upon the opposite ends of the second temperature sensor 34 to the terminals 126,128 of the dual-position slide switch mechanism 104. It is therefore to be appreciated and understood that in accordance with the unique and novel structural features characteristic of the new and improved hot melt adhesive hose assembly as constructed in accordance with the principles and teachings of the present invention, the new and improved hot melt adhesive hose assembly 10, including the heater circuits or heater resistance wires 18,20, the temperature sensors 32,34, and the switch mechanisms 102,104, effectively comprises a self-contained, stand-alone, or independent operative component that can be utilized in conjunction with any adhesive supply unit (ASU) and its temperature controller, not shown.

As illustrated, the first heater resistance wire 18 and the first temperature sensor 32 are operatively or electrically connected into the hot melt adhesive hose assembly electrical system, however, it can readily be appreciated that, in accordance with the principles and teachings of the present invention, if a failure should occur, for example, within the first heater resistance wire 18, the operator need only actuate the first dual-position slide switch mechanism 102 so as to effectively slide the first dual-position switch mechanism 102 from its upper illustrated position, at which the first dual-position slide switch mechanism 102 effectively bridges the electrical terminals 106,108,110, 112, to its lower position at which the first dual-position slide switch mechanism 102 will now effectively bridge electrical terminals 110,112,114,116. Accordingly, the failed or defective first heater resistance wire 18 has effectively been removed from the hot melt adhesive hose assembly electrical system, and the new, standby, or second, redundant heater resistance wire 20 will now be electrically incorporated into the hot melt adhesive hose assembly electrical system.

In a similar manner, it can likewise be readily appreciated that if a failure should occur, for example, within the first temperature sensor 32, the operator need only actuate the second dual-position slide switch mechanism 104 so as to effectively slide the second dual-position switch mechanism 104 from its upper illustrated position at which the second dual-position slide switch mechanism 104 effectively bridges the electrical terminals 118,120,122,124, to its lower position at which the second dual-position slide switch mechanism 104 will now effectively bridge electrical terminals 122,124, 126,128. Accordingly, the failed or defective first temperature sensor 32 has effectively been removed from the hot melt adhesive hose assembly electrical system, and the new, standby, or second, redundant temperature sensor 34 will now be electrically incorporated into the hot melt adhesive hose assembly electrical system. Therefore, there is no need to shut down the hot melt adhesive material dispensing production line in order to replace the hot melt adhesive hose assembly with failed heater resistance wire or the failed temperature sensor, because, to the contrary, such replacement procedures may be delayed until, for example, normal maintenance procedures are to be performed.

In connection with the failures of either one of the first and second heater resistance wires 18,20, or in connection with the failure of either one of the first and second temperature sensors 32,34, various means may be employed. For example, suitable current detection means may be employed in connection with the first and second heater resistance wires 18,20, as well in connection with the first and second temperature sensors 32,34, and accordingly, upon detection of an abnormal change in the detected current levels, an alarm may be sounded so as to alert operator personnel whereby the operator personnel can then of course manually actuate the pertinent dual-position slide switch mechanisms 102,104. Alternatively, automatic means may be incorporated within, or in conjunction with, the new and improved hot melt adhesive hose assembly 10 such that a change-over between the backup or redundant heater resistance wires 18, 20, or between the backup or redundant temperature sensors 32,34, can be achieved automatically without the need for any intervention by operator personnel. An alarm could still be provided to alert operator personnel to the fact that a failure has occurred and has accordingly been rectified, and in this manner, the operator personnel will know that the failed component does in fact need to be replaced during the next scheduled maintenance procedures.

Thus, it may be seen that in accordance with the principles and teachings of the present invention, there has been provided a new and improved hot melt adhesive hose assembly which comprises a hot melt adhesive hose core, a pair of heater circuits wrapped around the external peripheral surface of the hose core, and a pair of temperature sensors also disposed in contact with the external peripheral surface of the hose core. The pair of heater circuits are electrically connected to the hot melt adhesive hose assembly electrical circuitry through means of a first, dual-position slide switch mechanism, and in a similar manner, the pair of temperature sensors are electrically connected to the hot melt adhesive hose assembly electrical circuitry through means of a second, dual-position slide switch mechanism. It is therefore to be appreciated and understood that in accordance with the unique and novel structural features characteristic of the new and improved hot melt adhesive hose assembly as constructed in accordance with the principles and teachings of the present invention, the new and improved hot melt adhesive hose assembly, including the heater circuits or heater resistance wires, the temperature sensors, and the switch mechanisms, effectively comprises a self-contained, stand-alone, or independent operative component that can be utilized in conjunction with any adhesive supply unit (ASU) and its temperature controller. Should a failure occur within a first one of the heater circuits, then the first, dual-position slide switch mechanism is activated so as to effectively remove the first, failed heater circuit from the hot melt adhesive hose assembly electrical circuitry, and substantially simultaneously therewith, electrically connect the second one of the heater circuits to the hot melt adhesive hose assembly electrical circuitry. Similar switching procedures could also be implemented in connection with the pair of temperature sensors should a failure occur within a first one of the temperature sensors initially incorporated within the hot melt adhesive hose assembly electrical circuitry. Such redundancy eliminates the need to halt production for replacement of the failed hot melt adhesive hose assembly thereby preventing lost production time.

Obviously, many variations and modifications of the present invention are possible in light of the above teachings. For example, while the present invention has been specifically disclosed and illustrated in connection with the provision of redundant heater resistance wires and temperature sensors, the principles and teachings of the present invention could of course be applied to other electrical components of a hot melt adhesive dispensing system, such as, for example, the hot melt adhesive applicators, the adhesive supply units, the cartridge heaters, and the like. Still further, while a single redundancy for each heater resistance wire or each temperature sensor has been disclosed, multiple redundancies for such components are of course possible. It is therefore to be understood that within the scope of the appended claims, the present invention may be practiced otherwise than as specifically described herein.

What is claimed as new and desired to be protected by Letters Patent of the United States of America, is:

1. A hot melt adhesive hose assembly, comprising:
   a hose core conduit for conducting hot melt adhesive material from a hot melt adhesive supply end portion of said hose core conduit, which is adapted to be fluidically connected to a hot melt adhesive supply unit (ASU), to a hot melt adhesive applicator end portion of said hose core conduit which is adapted to be fluidically connected to a hot melt adhesive material applicator for dispensing hot melt adhesive material;
   an electrical power supply circuit;
   a first heater circuit operatively connected to said hose core conduit for heating said hose core conduit, when said first heater circuit is electrically connected to said electrical power supply circuit, so as to maintain the temperature of the hot melt adhesive material, being conducted through said hose core conduit, at a predetermined temperature level;

a second, redundant heater circuit operatively connected to said hose core conduit for heating said hose core conduit, when said second, redundant heater circuit is electrically connected to said electrical power supply circuit, so as to maintain the temperature of the hot melt adhesive material, being conducted through said hose core conduit, at the predetermined temperature level; and a dual-position switch mechanism electrically interconnecting said first and second, redundant heater circuits in an alternative manner such that if said first heater circuit experiences a failure, said second, redundant heater circuit can be electrically connected to said electrical power supply circuit so as to maintain the temperature of the hot melt adhesive material, being conducted through said hose core conduit, at the predetermined temperature level without interrupting the dispensing of the hot melt adhesive material, said dual-position switch mechanism being fixedly connected to said hot melt adhesive hose assembly such that said hot melt adhesive hose assembly, including said first and second heater circuits and said dual-position switch mechanism, effectively comprises a self-contained, stand-alone, independent operative component that can be utilized in conjunction with any adhesive supply unit (ASU).

2. The assembly as set forth in claim 1, wherein:
said dual-position switch mechanism comprises a dual-position slide-switch mechanism.

3. The assembly as set forth in claim 2, wherein said dual-position, slide switch mechanism comprises:
a first pair of terminals electrically connected to said first heater circuit;
a second pair of terminals electrically connected to said second redundant heater circuit;
a third pair of terminals electrically connected to said electric power supply circuit;
said dual-position slide switch mechanism electrically connecting said first heater circuit to said electric power supply circuit through means of said first and third pairs of terminals when said dual-position slide switch mechanism is disposed at a first one of two positions; and
said dual-position slide switch mechanism electrically connecting said second redundant heater circuit to said electric power supply circuit through means of said second and third pairs of terminals when said dual-position slide switch mechanism is disposed at a second one of two positions.

4. A hot melt adhesive hose assembly, comprising:
a hose core conduit for conducting hot melt adhesive material from a hot melt adhesive supply end portion of said hose core conduit, which is adapted to be fluidically connected to a hot melt adhesive supply unit (ASU), to a hot melt adhesive applicator end portion of said hose core conduit which is adapted to be fluidically connected to a hot melt adhesive material applicator for dispensing hot melt adhesive material;
an electrical power supply circuit;
a first heater circuit operatively connected to said hose core conduit for heating said hose core conduit, when said first heater circuit is electrically connected to said electrical power supply circuit, so as to maintain the temperature of the hot melt adhesive material, being conducted through said hose core conduit, at a predetermined temperature level;

a second, redundant heater circuit operatively connected to said hose core conduit for heating said hose core conduit, when said second, redundant heater circuit is electrically connected to said electrical power supply circuit, so as to maintain the temperature of the hot melt adhesive material, being conducted through said hose core conduit, at the predetermined temperature level;

a first temperature sensor operatively connected to said hose core conduit for detecting the temperature of said hose core conduit so as to ensure that said heater circuit is properly heating said hose core conduit in order to maintain the temperature of the hot melt adhesive material, being conducted through said hose core conduit, to the predetermined temperature level;

a second, redundant temperature sensor operatively connected to said hose core conduit for detecting the temperature of said hose core conduit so as to ensure that said heater circuit is properly heating said hose core conduit in order to maintain the temperature of the hot melt adhesive material, being conducted through said hose core conduit, to the predetermined temperature level;

a first dual-position switch mechanism electrically interconnecting said first and second, redundant heater circuits in an alternative manner such that if said first heater circuit experiences a failure, said second, redundant heater circuit can be electrically connected to said electrical power supply circuit so as to maintain the temperature of the hot melt adhesive material, being conducted through said hose core conduit, at the predetermined temperature level without interrupting the dispensing of the hot melt adhesive material;

a second dual-position switch mechanism electrically interconnecting said first and second, redundant temperature sensors in an alternative manner such that if said first heater circuit experiences a failure, said second, redundant heater circuit can be electrically connected to said electrical power supply circuit so as to maintain the temperature of the hot melt adhesive material, being conducted through said hose core conduit, at the predetermined temperature level without interrupting the dispensing of the hot melt adhesive material;

said first and second dual-position switch mechanisms being fixedly connected to said hot melt adhesive hose assembly such that said hot melt adhesive hose assembly, including said first and second heater circuits, said first and second temperature sensors, and said first and second dual position switch mechanisms, effectively comprises a self-contained, standalone, independent operative component that can be utilized in conjunction with any adhesive supply unit (ASU).

5. The assembly as set forth in claim 4, wherein:
said first and second dual-position switch mechanisms comprise dual-position slide-switch mechanisms.

6. The assembly as set forth in claim 4, wherein:
said first and second dual-position slide switch mechanisms are disposed within a single switch box assembly.

7. A hot melt adhesive hose assembly, comprising:
a hose core conduit for conducting hot melt adhesive material from a hot melt adhesive supply end portion of said hose core conduit, which is adapted to be fluidically connected to a hot melt adhesive supply unit (ASU), to a hot melt adhesive applicator end portion of said hose core conduit which is adapted to be fluidically connected to a hot melt adhesive material applicator for dispensing hot melt adhesive material;
an electrical power supply circuit;

a first heater circuit operatively connected to said hose core conduit for heating said hose core conduit, when said first heater circuit is electrically connected to said electrical power supply circuit, so as to maintain the temperature of the hot melt adhesive material, being conducted through said hose core conduit, at a predetermined temperature level;

a second redundant heater circuit operatively connected to said hose core conduit for heating said hose core conduit, when said second heater circuit is electrically connected to said electrical power supply circuit, so as to maintain the temperature of the hot melt adhesive material, being conducted through said hose core conduit, at a predetermined temperature level;

a temperature sensor operatively connected to said hose core conduit for detecting the temperature of said hose core conduit so as to ensure that either one of said first and second redundant heater circuits is properly heating said hose core conduit in order to maintain the temperature of the hot melt adhesive material, being conducted through said hose core conduit, to the predetermined temperature level; and a dual-position switch mechanism electrically interconnecting said first and second redundant heater circuits in an alternative manner such that if said first heater circuit experiences a failure, said second redundant heater circuit can be electrically connected to said electrical power supply circuit so as to maintain the temperature of the hot melt adhesive material, being conducted through said hose core conduit, at the predetermined temperature level, without interrupting the dispensing of the hot melt adhesive material, said dual-position switch mechanism being fixedly connected to said hot melt adhesive hose assembly such that said hot melt adhesive hose assembly, including said first and second redundant heater circuits, said temperature sensor, and said dual-position switch mechanism, effectively comprises a self-contained, stand-alone, independent operative component that can be utilized in conjunction with any adhesive supply unit (ASU).

8. The assembly as set forth in claim 7, wherein:
said dual-position switch mechanism comprises a dual-position slide-switch mechanism.

9. The assembly as set forth in claim 8, wherein said dual-position, slide switch mechanism comprises:
a first pair of terminals electrically connected to said first heater circuit;
a second pair of terminals electrically connected to said second redundant heater circuit;
a third pair of terminals electrically connected to said electric power supply circuit;
said dual-position slide switch mechanism electrically connecting said first heater circuit to said electric power supply circuit through means of said first and third pairs of terminals when said dual-position slide switch mechanism is disposed at a first one of two positions; and
said dual-position slide switch mechanism electrically connecting said second redundant heater circuit to said electric power supply circuit through means of said second and third pairs of terminals when said dual-position slide switch mechanism is disposed at a second one of two positions.

10. The assembly as set forth in claim 5, wherein said second dual-position, slide switch mechanism comprises:
a first pair of terminals electrically connected to said temperature sensor;
a second pair of terminals electrically connected to said second redundant temperature sensor; and
a third pair of terminals electrically connected to said electric power supply circuit;
said second dual-position slide switch mechanism electrically connecting said temperature sensor to said electric power supply circuit through means of said first and third pairs of terminals when said second dual-position slide switch mechanism is disposed at a first one of two positions; and
said second dual-position slide switch mechanism electrically connecting said second redundant temperature sensor to said electric power supply circuit through means of said second and third pairs of terminals when said second dual-position slide switch mechanism is disposed at a second one of two positions.

11. The assembly as set forth in claim 5, wherein said first dual-position, slide switch mechanism comprises:
a first pair of terminals electrically connected to said first heater circuit;
a second pair of terminals electrically connected to said second redundant heater circuit; and
a third pair of terminals electrically connected to said electric power supply circuit;
said first dual-position slide switch mechanism electrically connecting said first heater circuit to said electric power supply circuit through means of said first and third pairs of terminals when said first dual-position slide switch mechanism is disposed at a first one of two positions; and
said first dual-position slide switch mechanism electrically connecting said second redundant heater circuit to said electric power supply circuit through means of said second and third pairs of terminals when said first dual-position slide switch mechanism is disposed at a second one of two positions.

* * * * *